(12) United States Patent
Wang

(10) Patent No.: US 9,690,174 B2
(45) Date of Patent: Jun. 27, 2017

(54) SWITCHABLE PROJECTION WINDOW

(71) Applicant: Scienstry, Inc., Richardson, TX (US)

(72) Inventor: Jiansheng Wang, Plano, TX (US)

( * ) Notice: Subject to any disclaimer, the term of this patent is extended or adjusted under 35 U.S.C. 154(b) by 167 days.

(21) Appl. No.: 13/748,413

(22) Filed: Jan. 23, 2013

(65) Prior Publication Data

US 2014/0078410 A1   Mar. 20, 2014

Related U.S. Application Data

(60) Provisional application No. 61/701,272, filed on Sep. 14, 2012, provisional application No. 61/701,288, filed on Sep. 14, 2012.

(51) Int. Cl.
| | |
|---|---|
| *G02F 1/1334* | (2006.01) |
| *G03B 21/14* | (2006.01) |
| *G03B 21/608* | (2014.01) |
| *G02F 1/13* | (2006.01) |
| *G02F 1/1333* | (2006.01) |
| *G03B 21/16* | (2006.01) |
| *G03B 21/54* | (2006.01) |
| *G03B 21/60* | (2014.01) |

(52) U.S. Cl.
CPC ......... *G03B 21/145* (2013.01); *G02F 1/1313* (2013.01); *G02F 1/1334* (2013.01); *G02F 1/13338* (2013.01); *G03B 21/16* (2013.01); *G03B 21/54* (2013.01); *G03B 21/60* (2013.01); *G03B 21/608* (2013.01); *Y10T 29/49117* (2015.01); *Y10T 29/49826* (2015.01)

(58) Field of Classification Search
CPC ... G02F 1/1313; G02F 1/13338; G02F 1/1334
USPC .......... 349/16, 193, 86–94, 511, 5; 359/601, 359/609, 614, 443, 460, 275, 273, 265, 359/267
See application file for complete search history.

(56) References Cited

U.S. PATENT DOCUMENTS

| | | | |
|---|---|---|---|
| 4,688,900 A * | 8/1987 | Doane et al. .................... | 349/87 |
| 5,729,242 A | 3/1998 | Margerum et al. | |
| 6,261,650 B1 | 7/2001 | Kobayashi et al. | |
| 6,297,900 B1 * | 10/2001 | Tulloch et al. ............... | 359/275 |
| 6,502,339 B1 * | 1/2003 | Shapiro ................... | G09F 19/18 |
| | | | 40/560 |
| 6,577,355 B1 * | 6/2003 | Yaniv ..................... | G03B 21/28 |
| | | | 349/16 |

(Continued)

FOREIGN PATENT DOCUMENTS

| | | | | |
|---|---|---|---|---|
| FR | WO/2012/045973 | * | 4/2012 | ............... G02F 1/13 |
| GB | WO/2012/063010 | * | 5/2012 | ............... B44C 5/04 |
| KR | 1020080056932 | | 6/2008 | |

OTHER PUBLICATIONS

Article: "Current Trends in Polymer Dispersed Liquid Crystals" J.W. Doane, D.K. Yang and L.C. Chien (Liquid Crystal Institute, Kent State University) IEEE, 1991 International Display Research Conference (1991).*

*Primary Examiner* — Sang V Nguyen
(74) *Attorney, Agent, or Firm* — Wilson D Swayze, Jr.

(57) ABSTRACT

A window apparatus comprises a first layer including a liquid crystal microdroplet (LCMD) display switchable between transparent and opaque states in response to a change in an applied electrical voltage and a second layer coupled to the first layer. The second layer is changeable between a light transmitting configuration and a light blocking configuration.

39 Claims, 4 Drawing Sheets

(56) References Cited

U.S. PATENT DOCUMENTS

| | | | |
|---|---|---|---|
| 7,969,405 B2 | 6/2011 | Kwan | |
| 8,016,434 B2 | 9/2011 | Turner et al. | |
| 8,270,059 B2* | 9/2012 | Friedman | C03C 17/34 359/265 |
| 8,328,367 B2 | 12/2012 | Nemeth et al. | |
| 2004/0004827 A1* | 1/2004 | Guest | G02B 6/0091 362/612 |
| 2005/0007639 A1* | 1/2005 | Natarajan et al. | 359/15 |
| 2006/0126174 A1* | 6/2006 | Gibilini | G03B 21/625 359/460 |
| 2007/0024822 A1 | 2/2007 | Cortenraad et al. | |
| 2007/0103763 A1* | 5/2007 | Poll | E06B 3/66 359/265 |
| 2009/0027759 A1* | 1/2009 | Albahri | B60J 3/04 359/277 |
| 2010/0144432 A1 | 6/2010 | Nittou | |
| 2010/0184510 A1* | 7/2010 | Nittou | G07F 17/3211 463/30 |
| 2010/0238664 A1* | 9/2010 | Steenbergen | G02F 1/133308 362/276 |
| 2011/0018913 A1 | 1/2011 | Nittou | |
| 2012/0013813 A1* | 1/2012 | Sharp | G02B 27/26 349/5 |
| 2012/0140147 A1 | 6/2012 | Satoh et al. | |
| 2012/0176570 A1* | 7/2012 | Yamazaki | G02F 1/1334 349/86 |
| 2012/0182334 A1* | 7/2012 | Ranieri | G02B 27/2214 345/694 |
| 2013/0229612 A1* | 9/2013 | Gayout et al. | 349/193 |
| 2013/0265511 A1* | 10/2013 | Poix | B32B 17/10045 349/33 |
| 2013/0329166 A1* | 12/2013 | Poliakine | B44C 5/04 349/84 |
| 2014/0204294 A1* | 7/2014 | Lv | 349/16 |

\* cited by examiner

SWITCHABLE PROJECTION WINDOW

CROSS REFERENCE TO RELATED APPLICATIONS

This application claims the benefit of U.S. Provisional Applications 61/701,272 and 61/701,288 both filed Sep. 14, 2012, which are incorporated by reference herein in their entirety.

FIELD

The present disclosure is directed toward projection window systems and methods of use, and more particularly to systems and methods for window projection using liquid crystal microdroplet (LCMD) devices.

BACKGROUND

Continued advancements in the field of optoelectronics have led to the development of liquid crystal microdroplet (LCMD) displays. In this type of display, liquid crystal material is contained in microdroplets embedded in a solid polymer matrix. Birefringence results from a material having a different index of refraction in different directions. The extraordinary index of refraction ($n_e$) of a liquid crystal molecule is defined as that measured along the long axis of the molecule, and the ordinary index of refraction ($n_o$) is measured in a plane perpendicular to the long axis. The dielectric anisotropy of liquid crystals is defined as $\Delta\in = \in_\| - \in_\perp$, where $\in_\|$ and $\in_\perp$ are parallel and perpendicular dielectric constants, respectively. Liquid crystals having a positive dielectric anisotropy ($\Delta\in > 0$) are called positive-type liquid crystals, or positive liquid crystals, and liquid crystals having a negative dielectric anisotropy ($\Delta\in < 0$) are called negative-type liquid crystals, or negative liquid crystals. The positive liquid crystals orient in the direction of an electric field, whereas the negative liquid crystals orient perpendicular to an electric field. These electro-optical properties of liquid crystals have been widely used in various applications.

One approach to obtaining dispersed microdroplets in a polymer matrix is the method of encapsulating or emulsifying the liquid crystals and suspending the liquid crystals in a film which is polymerized. This approach is described, for example, in U.S. Pat. Nos. 4,435,047, 4,605,284 and 4,707,080. This process includes mixing positive liquid crystals and encapsulating material, in which the liquid crystals are insoluble, and permitting formation of discrete capsules containing the liquid crystals. The emulsion is cast on a substrate, which is precoated with a transparent electrode, such as an indium tin oxide coating, to form an encapsulated liquid crystal device.

LCMD displays may also be formed by phase separation of low-molecular weight liquid crystals from a prepolymer or polymer solution to form microdroplets of liquid crystals. This process, described in U.S. Pat. Nos. 4,685,771 and 4,688,900, includes dissolving positive liquid crystals in an uncured resin and then sandwiching the mixture between two substrates which are precoated with transparent electrodes. The resin is then cured so that microdroplets of liquid crystals are formed and uniformly dispersed in the cured resin to form a polymer dispersed liquid crystal device. When an AC voltage is applied between the two transparent electrodes, the positive liquid crystals in microdroplets are oriented and the display is transparent if the refractive index of the polymer matrix ($n_p$) is made to equal the ordinary index of liquid crystals ($n_o$). The display scatters light in the absence of the electric field, because the directors (vector in the direction of the long axis of the molecules) of the liquid crystals are random and the refractive index of the polymer cannot match the index of the liquid crystals. Nematic liquid crystals having a positive dielectric anisotropy ($\Delta\in > 0$), large $\Delta n$, which may contain a dichroic dye mixture, can be used to form a transparent and absorbing mode.

LCMD displays may be characterized as normal mode or reverse mode displays. A normal mode display containing liquid crystals is non-transparent (scattering or absorbing) in the absence of an electric field and is transparent in the presence of an applied electric field. A reverse mode display is transparent in the absence of an electric field and is non-transparent (scattering or absorbing) in the presence of an applied electric field.

If an electric field is applied on a LCMD display, liquid crystals in microdroplets are not entirely perpendicular to the substrate. The central part of liquid crystals in the droplets is clear if the refractive index of the polymer matches the ordinary refractive index of the liquid crystals ($n_o$). However, liquid crystals near the ends of the microdroplet are strongly bent because they are parallel to the skin of the inner layer. They are, therefore, tilted to the substrate surface, and the refractive index of the liquid crystals cannot match with the refractive indexes of the polymer matrix and inner layer. Therefore, parts of the liquid crystal droplets scatter light and produce haze.

There exists a need for devices that use improved LCMD technologies in projection systems that provide improved diffusion and provide for a wide viewing angle. These functions may be achieved with an improved scattering mechanism using, for example, a non-linear optical matrix system.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

DETAILED DESCRIPTION

Figure 1:
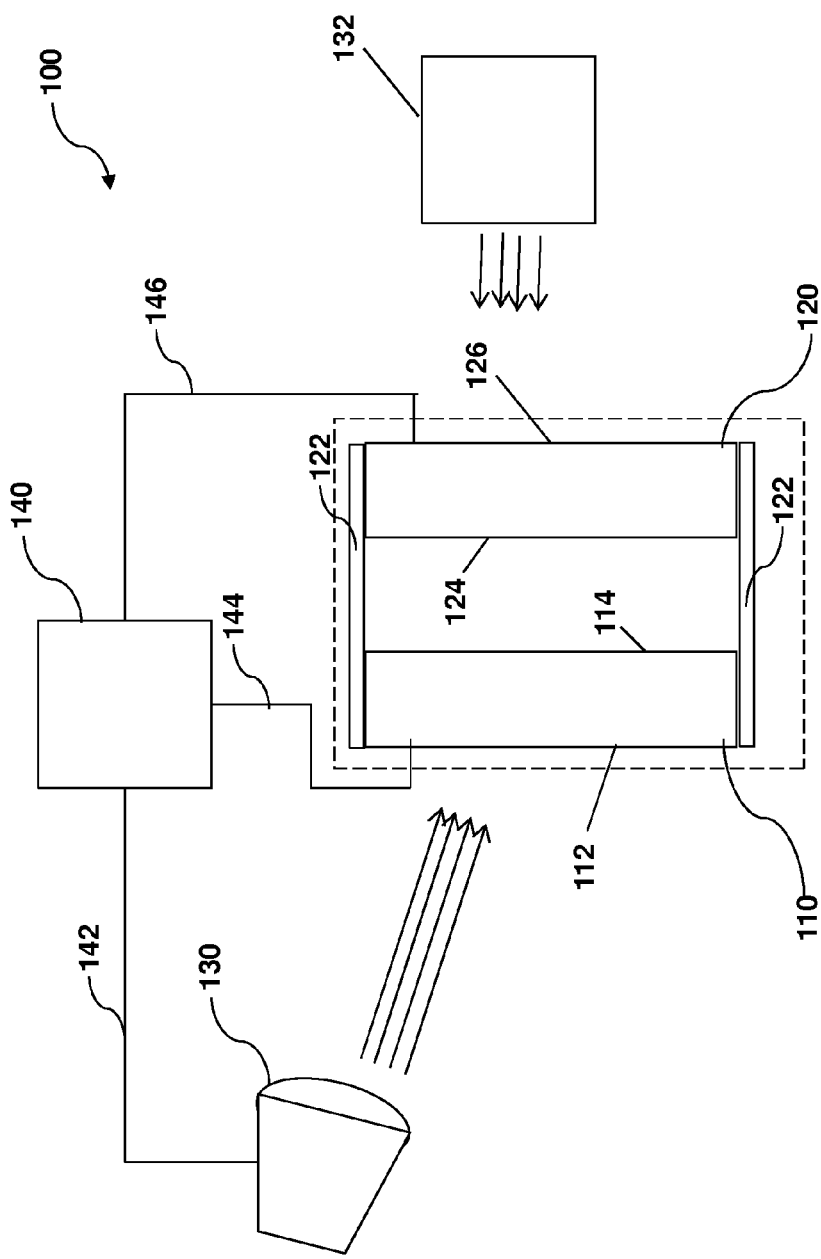
FIG. 1 is an exemplary diagram of a switchable projection window according to one or more embodiments.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "LCMD device" or "LCMD film" or "LCMD display" means a device or film or display, respectively, formed using various classes of polymer films. For example, and LCMD device may be formed using nematic curvilinear aligned phase (NCAP) films, such as material and devices described in U.S. Pat. No. 4,435,047 filed Sep. 16, 1981 disclosing "Encapsulated Liquid Crystal and Method," which is incorporated by reference herein in its entirety. An LCMD device may also be formed using polymer dispersed liquid crystal (PDLC) films formed using phase separation in a homogenous polymer matrix, such as material and devices described in U.S. Pat. No. 4,688,900 filed Sep. 17, 1985 disclosing "Light Modulating Material Comprising a Liquid Crystal Disperson in a Plastic Matrix," which is incorporated by reference herein in its entirety. An LCMD device may also be formed using a non-homogenous polymer dispersed liquid crystal display (NPD-LCD) formed using a non-homogenous light transmissive copolymer matrix with dispersed droplets of liquid crystal material, such as material and devices described in U.S. Pat. No. 5,270,843 filed Aug. 31, 1992 disclosing "Directly Formed Polymer Dispersed Liquid Crystal Light Shutter Displays," which is incorporated by reference herein in its entirety. Other forms of liquid crystal microdroplet films may also be suitable. A NPD-LCD device may be configured in one of two modes. In a positive mode, an NPD-LCD device is switchable between an opaque state without an applied electrical voltage and clear state with an applied electrical voltage. In a negative mode, an NPD-LCD device is switchable between a clear state without an applied electrical voltage and an opaque state with an applied electrical voltage.

Switchable Projection Window

Referring to FIG. 1, an example of a switchable projection window apparatus 100 is illustrated according to one or more embodiments of the present disclosure. The apparatus 100 includes a first layer 110, a second layer 120, a frame 122, a projector 130, an electrical power supply 140, and electrical cords 142, 144, 146. However, other configurations and inclusion or omission of the apparatus 100 may be possible. The apparatus 100 is an example embodiment and is not intended to limit the present invention beyond what is explicitly recited in the claims. For example in various embodiments, a frame may be omitted.

The first layer 110 includes a surface 112 and an opposite surface 114. The first layer may contain LCMD material in various forms including LCMD film in which LCMD material is sandwiched between two layers of transparent plastic film which is precoated with indium tin oxide (ITO); LCMD glass in which LCMD material is sandwiched between two layers of glass which is precoated with ITO; switchable glass (the LCMD film is laminated between two layers of glass with adhesive layers or interlayer or sandwiched between two layers of glass without adhesive layers or interlayer); or switchable plastic (the LCMD film is laminated between two layers of plastic with adhesive layers or interlayer or sandwiched between two layers of glass without adhesive layers or interlayer). The second layer 120 includes a surface 124 and an opposite surface 126. The surface 112 of the first layer 110 faces the projector 130 and the surface 114 of the first layer 110 faces the surface 124 of the second layer 120. The first layer 110 is mounted to the second layer 120 by the frame 122. The surface 114 of the first layer 110 may or may not directly contact the second layer 120. For example, in an alternative embodiment, the first layer 110 may be contacted directly to the second layer 120 such that the surfaces 114 and 124 are in direct contact. In this embodiment, the frame 122 may be omitted and a bonding agent, such as an adhesive, may be used to bond the layers. In another alternative embodiment, the first layer 110 may be fused to the second layer 120 by sharing surface materials of surface 114 of first layer 110 and surface 124 of second layer 120, therefore, the surfaces 114 and 124 are eliminated. In this embodiment, the frame 122 may be omitted.

The first layer 110 may be connected to the electrical power supply 140 through the electrical cord 144. The second layer 120 may be connected to the electrical power supply 140 through the electrical cord 146. Switches (not shown) may be included to allow electrical voltage to be selectively supplied to the first layer 110 and/or the second layer 120. As shown in FIG. 1, the first layer 110 is positioned between the projector 130 and the second layer 120. In this configuration, any light from the projector 130 that impacts the surface 124 of the second layer has been transmitted through the first layer 110.

In various embodiments, one or both of the layers 110, 120 is movable out of the transmission path of light transmitted toward the surface 112 of the first layer 110. In a closed state, the layer is positioned within the path of the light, and in an open state, the layer is removed from the path of the light. For example either or both of the layers 110, 120 may be movable by a hinge mechanism (e.g. a casement style window), a sliding mechanism, a swing mechanism, a hanging mechanism, a rolling mechanism, or other movement system that transitions one or both of the layers between the closed state and the open state and vice versa. The movement between the open and closed states may be achieved by a motorized drive mechanism or may be performed manually or mechanically. In one embodiment, for example, a layer is movable between a furled and an unfurled configuration by a motorized rolling mechanism.

The window apparatus 100 may be used as a window of an enclosed structure such as a building or a vehicle. Alternatively, the window apparatus may be used as a partial or complete partition between portions of a room or vehicle. Where the window apparatus 100 is used as a window, the surface 126 of the second layer receives light transmitted from an energy source 132. The energy source 132 may transmit light energy and/or thermal energy. In various embodiments, the energy source 132 may be, for example, the sun or an outdoor lighting system.

The projector 130 may be any form of a light projector including, for example, an image projector such as a video or still image projector. The projector 130 is installed to face and transmit light energy toward the surface 112 of the first layer 110 for front projection. The projector 130 can be installed in an indoor or an outdoor location. For example, the projector 130 can be installed on ground, on roof of a room, on wall of a room or on the first layer 110. In another example, a short throw projector toward the surface 114 may be positioned between first layer 110 and second layer 120 for rear projection. The projector 130 is connected to the power supply 140 by the electrical cord 142.

The projector 130 includes a light source, such a light bulb or a light emitting diode (LED) bulb, an image converter, and a plurality of lens. The projector 130 may include a computer or is connected to a computer providing a digitized image to the image converter. A light generated from the light source is projected to the image converter, therein the digitized image is converted to an optical image, and then is projected (focused) the first layer 110.

The power supply 140 is connected to the projector 130, the first layer 110, and the second layer 120 by the electrical cords 142, 144, 146, respectively. Alternatively, one or both of the first and second layers 110, 120 may be unpowered and thus not connected to the power supply.

As will be described in the embodiments that follow, the first layer is switchable between an opaque, light-scattering state and a transparent or open state. The second layer is changeable between a light-blocking state and a transparent or open state. In one embodiment, the first layer 110 includes a switchable NPD-LCD film or LCMD film and the second layer 120 is formed of a non-switchable material such as wood, plastic, leather, textiles, dark glass, painted glass, metal, inorganic materials (e.g. marble or ceramic tile) or a combination thereof. Various configurations for this embodiment are described in Table 1 and in further detail in the descriptions that follow.

When the first layer is in an opaque state, as in the first or second configuration, the first layer may serve as a writing surface such as a dry erase board.

In the third configuration as shown in Table 1, the first layer 110 is in a closed position and the NPD-LCD film is in a clear (i.e., transparent) state. The second layer 120 is in an open position. In this configuration, the window apparatus 100 functions as a traditional closed transparent window. Viewers can see through the window and sunlight can pass through the apparatus 100, like a traditional closed window. In the clear state, holographic images from the projector 130 may be displayed on first layer 100 and viewed by a viewer looking at the first layer 110.

In the fourth configuration as shown in Table 1, the first layer 110 is in an open position. The second layer 120 is also in an open position. In this configuration, the window apparatus 100 functions as a traditional open window. Light and air can pass through the apparatus 100.

TABLE 1

| | First Layer | | | | |
|---|---|---|---|---|---|
| | | Physical | Optical | Second Layer | |
| | Material | State | State | Material | State | Function and result |
| 1 | Switchable NPD-LCD | Close | Opaque | Non-Switchable | Close | When outside light is blocked by second layer and first layer is in opaque status, high quality projected images can be shown on the first layer. |
| 2 | Switchable NPD-LCD | Close | Opaque | Non-Switchable | Open | When second layer is open and first layer is in opaque state, first layer can function as a light diffuser and window film to bring soft light into room and save energy by rejecting heat/infrared. |
| 3 | Switchable NPD-LCD | Close | Clear | Non-switchable | Open | When second layer is open and first layer is in transparent status, the apparatus functions as a traditional closed window, allowing a viewer to see through from either side of the window and allowing outdoor light to pass through. |
| 4 | Switchable NPD-LCD | Open | Any | Non-switchable | Open | When both first and second layers are open, both light and air can pass through, like an opened normal window. |

In the first configuration as shown in Table 1, the first layer 110 is in a closed position and the NPD-LCD film is in an opaque state. The second layer 120 is also in a closed position. In this configuration, sunlight is blocked by the second layer 120. Images from the projector 130 may be transmitted to the opaque first layer 110 and viewed by a viewer looking at the first layer 110. The images may be two- or three-dimensional images. If the projector is an interactive projector, the first layer may be used as a touch screen input device allowing the projector to recognize a user touch to the first layer as an input signal for processing by a computer. In alternative embodiments, a touch screen film or a touch screen infrared frame may be coupled to the first layer to create a touch screen input device that delivers an input signal for processing by a computer.

In the second configuration as shown in Table 1, the first layer 110 is in a closed position and the NPD-LCD film is in an opaque state. The second layer 120 is in an open position. In this configuration, the first layer 110 can function as diffuser and window film to bring soft light into room and save energy by rejecting heat and or infrared energy.

In various alternative embodiments, the first layer 110 may be a light diffusion device such as a non-switchable fiberglass projection screen or a clear-type projection film/screen, such as a holographic film/screen or a 3D projection film, or ink-microball projection film/screen or other types of projection film/screen.

Figure 2B:
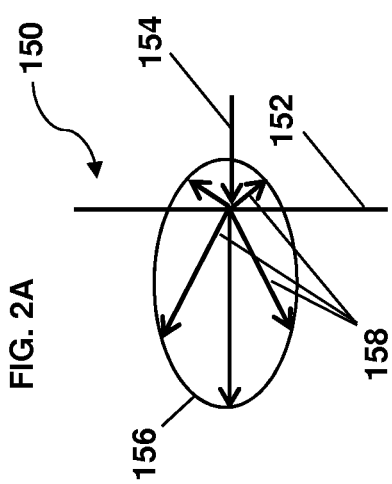
FIGS. 2A and 2B are illustrations of light scattering with different LCMD films.
Figure 2A:
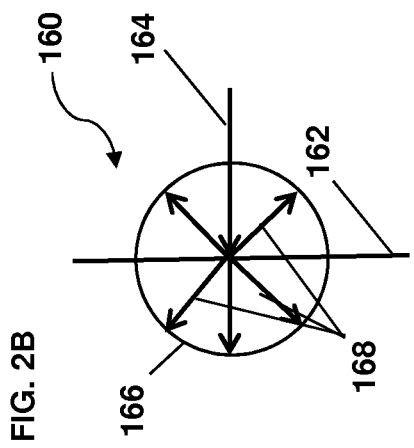

The use of an NPD-LCD film, as the first layer, may be particularly suitable for use with the window apparatus 100. For example, an NPD-LCD film may provide a projection surface with lower haze in a clear state and higher scattering in an opaque state, as compared to other LCMD films. FIGS. 2A and 2B illustrate different levels of light scattering, or oval scattering 150 and spherical scattering 160. In alternative embodiments, LCMD films may have different scattering properties. In FIG. 2A, an LCMD film, such as an NCAP or PDLC film 152 in an opaque state receives incident light 154. The incident light 154 becomes scattered by the film 152. The oval 156 represents the intensity of scattered light 158 in different directions. In FIG. 2B, an LCMD film, such as an NPD-LCD film 162 in an opaque state receives incident light 164. The incident light 164 becomes scattered by the film 162. The circle 166 represents the intensity of scattered light 168 in different directions. FIG. 2B illustrates a scattering pattern that is more suitable for projection than the scattering pattern of FIG. 2A. In FIG. 2A, the scattered light 158 directed back toward the incident (right) side of the film is much weaker than scattered light directed from the transmitted (left) side. The film 152 has no or poor projection capability, especially in a front projection. Front projection utilizes back scattering capability. In a rear projection embodiment, the film 152 will produce a bright zone or hot spot. In a front projection embodiment, the projected image will be too dark and waste too much light for suitable projection.

In FIG. 2B, the scattered light 168 is equal in different sides and scattering light has the same intensity in all angles. The closer the scattering pattern is to a spherical scattering pattern, the more suitable the film may be for both front and rear projection because scattered light will be equally distributed at any angle as well as in both sides of the sample. These scattering patterns of FIG. 2B provide the film 162 with both front and rear projection capability. To achieve these scattering patterns, an NPD-LCD film may be constructed of approximately 50 layers of nano droplets in its formulation structure and utilize nonlinear technology to allow light travel in a curved way. Generally, the flatter the oval shape of the scattered light, the weaker the scattering capability and the hidden power of the film. When scattering gets stronger, the oval shape becomes more round. The view blocking capability of an LCMD film is also related to its scattering levels. The better scattering a film has, the greater the back scattering in opaque states. In other words, high quality LCMD film with optimum projection capability should have a wider viewing angle.

In various embodiments, an advantage of NPD-LCD films is that since the polymer matrix is a non-linear copolymer system and since light transmits within non-linear matrix in a curved way, an incident light may transmit to any direction including transmitting (not reflect or scatter on intersurface) back to the incident side. Therefore, the incident angle of light becomes largely irrelevant, allowing high quality projection and viewing from any angle. With NPD-LCD film a nearly perfect spherical scattering may be achieved. That is, a spot receiving an incident light beam from any angle may scatter the light with same intensity in a sphere about that spot. In other words, the NPD-LCD device may effectively have a nearly infinitely wide viewing angle, such that an image projected on the film may be viewed from any angle without distortion. Working as a projection screen, NPD-LCD device may have viewing angle independent (VAI) brightness or same brightness in 360°. Therefore, NPD-LCD film can be used for both rear projection and front projection with very uniformity of brightness through entire screen. Furthermore, NPD-LCD film with spherical scattering 160 has another advantage of using a short throw projector which has a throw ratio (i.e., projection distance/projection size in diagonal) of less than 1. Since a short throw projector is mounted quite close to a projection screen or film, such mounting may eliminate reflection from a projector toward a viewer.

Like many other linear systems, PDLC film and NCAP film have an elliptical scattering and scattering of NCAP film has much flatter elliptical pattern which is not suitable for any kind of projection. PDLC film may be inadequate for use in front projection, creating a dimmed image with narrow viewing angle, and may be inadequate to use a short throw projector to avoid reflection. The scattering quality of projection screens made of transparent or switchably transparent materials is dependent on so called "oval effect" of scattering. Any scattering point on PDLC film is functioned as scattering center which is one foci of ellipse. That is, light intensity scattered from an opposite side is greater than the light intensity scattered from the incident side. Any scattering point of an NPD-LCD film becomes a scattering center of perfect circle or sphere. That is, light intensity scattered in all directions are with the same magnitude.

The use of an NPD-LCD film, as the LCMD film of the first layer, may also be particularly suitable for use with the window apparatus 100 because the NPD-LCD film may be constructed to perform consistently within a temperature range from −40° to 90° C., without experiencing a degradation in opacity or increased haze in the clear state. Thus, the window apparatus 100 may be installed in a building or vehicle such that the opposite sides of the apparatus are subjected to different temperatures (e.g. a differential of approximately 70° C.) without experiencing a perceptible change in opacity or transparency.

The use of an NPD-LCD film, as the LCMD film of the first layer, may be particularly suitable for use with the window apparatus 100 because NPD-LCD film may be demonstrate enhanced chemical stability and may require a lower driving voltage as compared to other LCMD films.

Figure 3A:
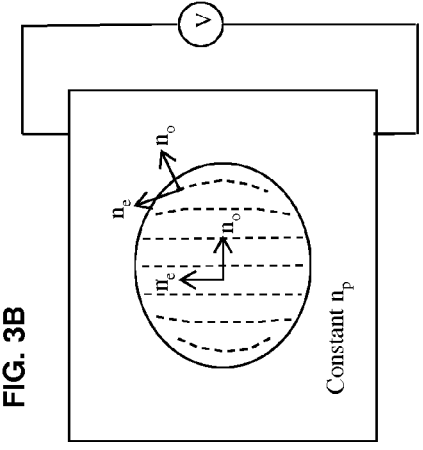
FIGS. 3A, 3B, and 3C are liquid crystal alignment in LCMD films with the application of voltages.
Figure 3B:
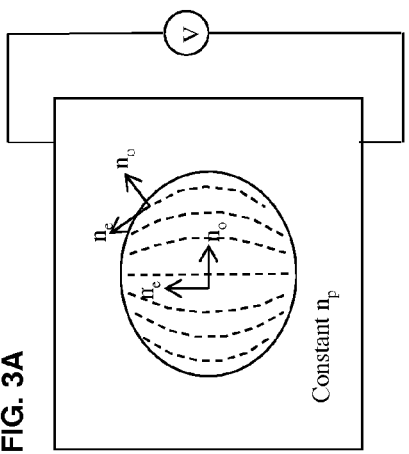

For example, with a PDLC or NCAP film, a clear status can be achieved by matching ordinary reflective index ($n_o$) of liquid crystals with polymer reflective index ($n_p$). In a positive mode PDLC film, AC voltage may turn liquid crystals from a random orientation to a perpendicular orientation. The polymer matrix is uniform and has a constant reflective index $n_p$, but the alignment of liquid crystals in the microdroplets is not uniformly perpendicular to the substrate as shown in FIG. 3A. Only the center portion of liquid crystals in the microdroplets is oriented with electric field perpendicular to the substrate. Liquid crystals near the periphery of prolonged microdroplets tend toward a curved arrangement, with the liquid crystals generally parallel to the inner surface of the microdroplets, by chemical force, surface tension or surface energy. Orientation of liquid crystals is balanced between electrical force and chemical force. The size of the center portions of droplets with the vertical alignment may be proportional to an applied voltage. As shown in FIG. 3B, a higher voltage results a better transparency by enlarging the size of the center portion in droplets, i.e. enlarging the proportion of vertically aligned liquid crystals to non-vertically aligned crystals. Thus, PDLC devices may have insufficient clearness and an unacceptably high voltage driving because there are always some portion of liquid crystal near the ends of the prolonged microdroplets in which polymer reflective index $n_p$ cannot match reflective index $n_o$ of tilted liquid crystals. In various embodiments, NCAP films may have a driving voltage of approximately 100V. PDLC films may have a driving voltage of approximately 70V. NPD-LCD films may have a driving voltage of less than 50V, with a driving voltage of approximately 15V being particularly suitable. Energy consumption is therefore also lower with NPD-LCD films. For example an NPD-LCD device may have an energy consumption of approximately 1 watt/m², while NCAP devices and PDLC devices have much higher energy consumption. Since a potential of electrochemical reactions can be reduced by lowering voltage, lifetime of NPD-LCD films is greatly increased by a low voltage driving.

Figure 3C:
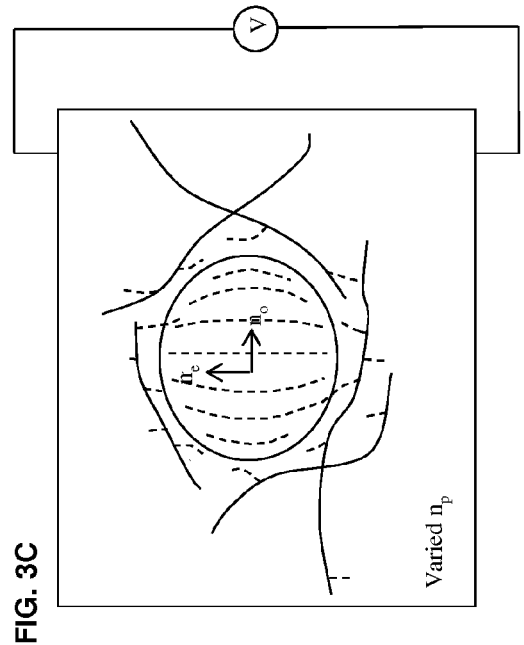

In NPD-LCD film, at least two types of monomers or prepolymers with different reactivity may be used. The faster reactive monomer forms a main body of polymer matrix. The slower reactive monomer is mainly distributed near inner surfaces of the microdroplets. If monomers with side chain and slow reactivity are used, a comb-shape polymer or a liquid crystal polymer near inner surface of the microdroplets is formed. A comb-shape polymer and liquid crystal polymer may have a main chain linking many side chains. These side chains are compacted in a relatively small space like a comb, so that, the side chains are arranged parallel like an alignment of liquid crystals by an electrical force. If the chains are flexible, comb-shape polymer can be formed and if the side chains have a rod-like structure, liquid crystal polymer can be formed. These side chains may extend into liquid phase in the microdroplets and small molecules of liquid crystals may insert into side chains of the inner surface of the microdroplets. Such structure makes matching reflective indexes between the ordinary index ($n_o$) of the liquid crystals and the inner surface of microdroplets quite easy. This is because the structures of the comb shaped polymer or liquid crystal polymer and the structure of liquid crystals are similar. They are belonged to rod-like structures and tend to align in a nematic formation. From the main body of the copolymer matrix to the inner surface of the microdroplets, the reflective indexes are not constant but are gradually changed. As shown in FIG. 3C, the refractive index near the inner surface of the varied polymer ($n_p$) and the refractive index of the liquid crystal ($n_o$) are highly similar, allowing the liquid crystal molecules to align with branches of the comb shaped polymer to achieve a match within the entire droplet. In this way, although there is a boundary, there is no sudden change in the refractive index, so the light can pass through the boundary without scattering. Since scattering or reflection only occurs on a suddenly changed intersurface, there is no scattering or reflection occurring within the gradually changed matrix or non-linear matrix or non-homogenous matrix. Therefore, the polymer matrix remains transparent. For example, NPD-LCD film may have a 0-3% haze as compared to the 6-9% haze of NCAP or PDLC films.

The NPD-LCD films thus may offer several potential advantages. For example, NPD-LCD films may obtain a high clearness with a low driving voltage as compared to PDLC or NCAP films. Since NPD-LCD matches the reflective index of liquid crystals and the polymer reflective index near the entire inner surface of each microdroplet, a high transparency may be obtained due to the natural matching mechanism. Another potential advantage of NPD-LCD films is that the reflective index matching in entire droplets does not require a high voltage. Thus, NPD-LCD devices can achieve a high transparency with a low driving voltage.

In various embodiments, an advantage of an NPD-LCD copolymer film system is that it includes side chain monomers and/or liquid crystal monomers with a relative lower reactivity. All other components with relative faster reactivities can be included into the copolymer system without any difficulty of matching indexes. This may permit greater versatility for adding main components or other chemicals for improvements, such as anti-UV, anti-moisture or waterproof, anti-aging properties, as well as enhancing adhesion to prevent delamination. Another advantage of an NPD-LCD film is that an index matching mechanism of an NPD-LCD system is mainly dependant on structures and the orientation of side chains near the inner surface of the copolymer or liquid crystal side chains of the copolymer, which are close to a rod-like structure of nematic liquid crystals. NPD-LCD film also has a wide selective range for liquid crystals. Therefore, liquid crystals with a wider temperature range, fast response time, or high UV stability may be used regardless their ordinary index $n_o$.

Another potential advantage of an NPD-LCD copolymer film system is that since such non-linear polymer system allow light to travel in cured way within the non-linear polymer matrix, an incident light has much greater chances to come out from the incident side, offering very wide viewing angle and same brightness in any angle for projection. The light is energy, especially for long wavelength of light such infrared. The NPD-LCD non-linear system also offers over 70% heat rejection function by bouncing back infrared and 100% UV protection function by bouncing back (and absorbing) ultraviolet light in its opaque state.

In another embodiment, the first layer 110 includes an LCMD film and the second layer 120 is formed of an electrically switchable material. The electrically switchable material of the second layer may be, for example, a twisted nematic (TN) liquid crystal device; a super twisted nematic (STN) liquid crystal device; a dichroic liquid crystal display (LCD); a dichroic LCMD (i.e., an NPD-LCD film which includes dyes and has a clear state and an opaque state that appears black or another dye color); suspended particle devices (SPD); electrochromic devices (ECD); or other electrically switchable materials that may be changed between a light transmissive (e.g. clear) state and a non-transparent light blocking state, (e.g. having a dark shade such as black). Alternatively, the second layer may include a composite of an LCMD film and one of the electrically switchable materials listed above, such as TN or a dyed LCMD film. Various configurations for this embodiment are described in Table 2 and in further detail in the descriptions that follow.

TABLE 2

| | First Layer | | | Second Layer | | | |
|---|---|---|---|---|---|---|---|
| | Material | Physical State | Optical State | Material | Physical State | Optical State | Function and result |
| 1 | Switchable NPD-LCD | Close | Opaque | Switchable | Close | Black | When outside light is blocked by second layer and first layer is in opaque status, high quality projected images can be shown on the first layer. |
| 2 | Switchable NPD-LCD | Close | Opaque | Switchable | Open | Any | When second layer is open and first layer is in opaque state, first layer can function as a light diffuser and window film to bring soft light into room and save energy by rejecting heat/infrared. |

TABLE 2-continued

| | First Layer | | | Second Layer | | |
|---|---|---|---|---|---|---|
| | Material | Physical State | Optical State | Material | Physical State | Optical State | Function and result |
| 3 | Switchable NPD-LCD | Close | Clear | Switchable | Open | Any | When second layer is open and first layer is in transparent state, the apparatus functions as a traditional closed window, allowing a viewer to see through from either side of the window and allowing outdoor light to pass through. |
| 4 | Switchable NPD-LCD | Open | Any | Switchable | Open | Any | When both first and second layers are open, both light and air can get pass through, like an opened normal window. |

In the first configuration as shown in Table 2, the first layer 110 is in a closed position and the NPD-LCD film is in an opaque state. The second layer 120 is also in a closed position and the electrically switchable material is in a darkened state. In this configuration, sunlight is blocked by the second layer 120. Images from the projector 130 may be transmitted to the opaque first layer 110 and viewed by a viewer looking at the surface 112 of the first layer 110. The images may be two- or three-dimensional images. If the projector is an interactive projector, the first layer may be used as a touch screen input device allowing the projector to recognize a user touch to the first layer as an input signal for processing by a computer. In alternative embodiments, a touch screen film or a touch screen infrared frame may be coupled to the first layer to create a touch screen input device that delivers an input signal for processing by a computer.

In the second configuration as shown in Table 2, the first layer 110 is in a closed position and the NPD-LCD film is in an opaque state. The second layer 120 is in either a closed position with the electrically switchable material in a clear state or in an open position. In this configuration, the first layer 110 can function as diffuser and window film to bring soft light into room and save energy by rejecting heat and or infrared energy.

When the first layer is in an opaque state, as in the first or second configuration, the first layer may serve as a writing surface such as a dry erase board.

In the third configuration as shown in Table 2, the first layer 110 is in a closed position and the NPD-LCD film is in a clear state. The second layer 120 is in either a closed position with the electrically switchable material in a clear state or in an open position. In this configuration, the window apparatus 100 functions as a traditional closed transparent window. Viewers can see through the window and sunlight can pass through the apparatus 100, like a traditional closed window.

In the fourth configuration as shown in Table 2, the first layer 110 is in an open position. The second layer 120 is also in an open position. In this configuration, the window apparatus 100 functions as a traditional open window. Light and air can pass through the apparatus 100.

In various other embodiments, the first layer 110 includes a projection screen and/or light diffusion function material, such as a cloth, a plastic, or a fiberglass.

The apparatus 100 may be used, for example, as a component of a venue such as a home theater or a multi-purpose commercial or civic auditorium. The venue may receive sunlight through the apparatus when used for an activity that does not require darkness. Thus, the venue may be multi-purpose, serving as a game room, a study room, an office, a performance venue, or the like. When darkness is required for an activity such as movie watching or a live theatrical performance, the apparatus may be used as a projection screen. Thus, the apparatus 100 may increase the utility, efficacy, energy-efficiency, and versatility of the home or auditorium.

A method of installing a window apparatus in an enclosure between an indoor region and an outdoor region or between different indoor regions comprises installing a first layer of the window apparatus such that a surface of the first layer is in communication with the indoor region. The first layer includes a liquid crystal microdroplet (LCMD) display switchable between transparent and opaque states in response to a change in an applied electrical voltage. The method further includes installing a second layer of the window apparatus such that a surface of the second layer is in communication with the outdoor region. The second layer is mounted or fused to the first layer and the second layer is changeable between a light transmitting configuration and a light blocking configuration. The window apparatus may be coupled to a power supply.

Anti-Glare Projection

Referring to FIGS. 4-7, examples of anti-glare projection screen systems 300, 301, 302, 303 are illustrated according to one or more embodiments of the present disclosure. Components that are the same or similar in the various embodiments are identified with the same identification numeral. The anti-glare projection screen systems 300, 301, 302, 303 include a projection screen 310 and an anti-glare film 312. However, other configurations with inclusions or omissions may be suitable. The anti-glare projection screen systems are example embodiments, and are not intended to limit the present invention beyond what is explicitly recited in the claims.

The projection screen 310 includes a first surface and a second surface opposite the first surface. The projection display 310 is connected to the electrical power supply 320 by an electrical cord 322. The projection display 310 includes a switchable LCMD film. The projection screen 310 with an LCMD film is switchable between a transparent (clear) state and an opaque state with or without electrical voltage.

Figure 5:
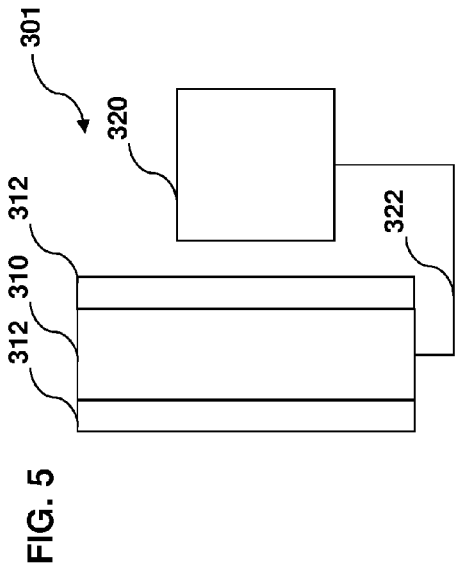
FIGS. 4-7 are examples of an anti-glare projection screen according to one or more embodiments.
Figure 4:
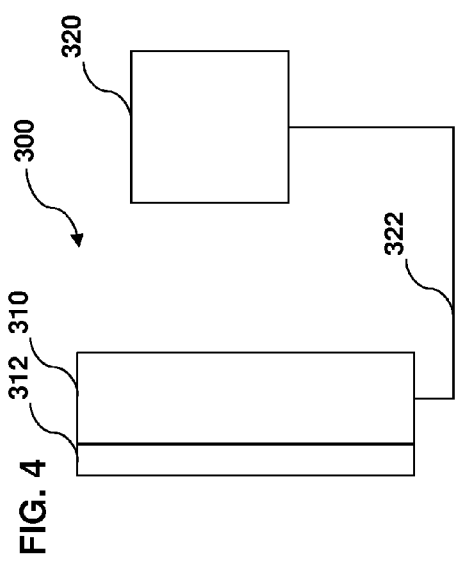
Figure 7:
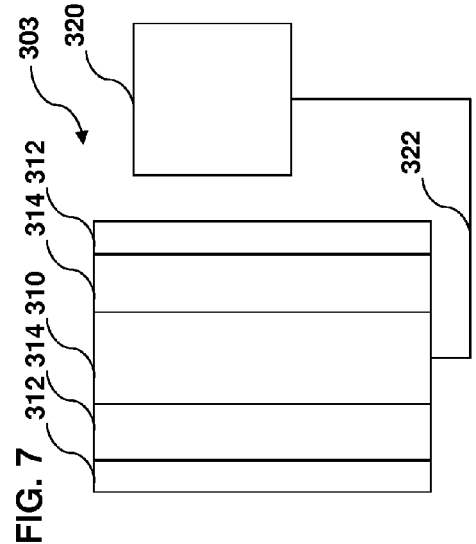
Figure 6:
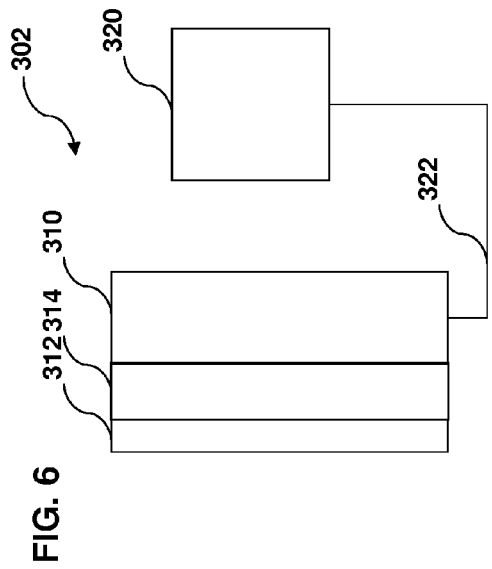

As shown in FIG. 4, the anti-glare film 312 may be deposited on at least one of the first and second surfaces of the projection display 310. As shown in FIG. 5, the anti-glare film 312 is deposited on both first and second surfaces of the projection display 310. Anti-glare coatings or films can increase image quality by removing or reducing unwanted reflections or reflected images from the presented images. The anti-glare film 312 may include an organic anti-glare film or an inorganic anti-glare film. The anti-glare film 312 can be applied by a deposition process. Other film formation processes may also be suitable. In the present embodiments, an anti-glare film is also referred to as an anti-glare coating. Alternatively, an anti-glare surface treatment may include a roughened surface. Anti-glare films, anti-glare coatings, and anti-glare surface treatments may all be considered types of anti-glare mechanisms As shown in FIG. 6, a transparent sheet 314 (e.g., glass or clear plastic) is adhered to at least one of the first and second surfaces of the projection display 310 and the anti-glare film 312 is applied on the transparent sheet 314. Thus, the anti-glare film does not directly contact the projection screen. As shown in FIG. 7, a transparent sheet 314 is adhered to both of the first and second surface of the projection display 310 and then the anti-glare film 312 is applied on the transparent sheet 314. The transparent sheet 314 includes a transparent glass or a transparent plastic. The transparent sheet 314 is adhered to the first or the second surface of the projection display by using glue or resin, or by using a lamination process. Other alternative processes may be suitable.

The power supply 320 is connected to the projection screen 310 by the electrical cord 322. The power supply 250 provides electrical voltage to projection display 310 to change state of the projection screen 310 between transparent and opaque. For example, the projection screen 310 may be transparent or clear when a voltage is applied to the projection display 310 and the projection screen 310 may be opaque or dark when a voltage is withdrawn or reduced.

In some embodiments, the anti-glare projection screen systems 300, 301, 302, 303 may be suitably used in applications in which the projection screen is subjected to temperature fluctuation or in which one of the first and the second surfaces of the projection display 310 is subjected to a temperature which is different from the temperature of the other surface of the projection screen 310. For example, when the projection screen 310 includes a NPD-LCD film and is installed on an outer door of a business or residence that is subjected to heat and sunlight, a user can see through the film by engaging a switch connecting the film to an electrical supply. In this embodiment, engaging the switch may change the film from an opaque to a clear state. Thus, the user can see through the door, without opening it, and potentially avoid a dangerous situation. In another example, when the projection screen 310 include a NPD-LCD film and is installed on a door of a refrigerator or cabinet, a user can see through the NPD-LCD display by engaging a switch connecting the NPD-LCD display without opening the door of the refrigerator or cabinet and wasting energy.

The combination of LCMD film and anti-glare coating on a window may improve the quality of projected images, for example, for rear projection on a storefront window when viewed from outside and for front projection in a home theater. On an LCMD film screen without anti-glare treatment for use in a home theater, for example, light (including from outdoor or indoor sources) may cause reflections that significantly affect image quality. When using a traditional long throw projector in a home theatre without anti-glare treatment, a viewer may see a bright reflection spot of the projector on the projection screen. Removing the reflection by using anti-glare coatings on the projection screen may allow the use of a normal long throw projector mounted under a ceiling.

In some embodiments, an anti-glare projection screen apparatus is described. The apparatus includes an projection screen having a first surface and a second surface opposite to the first surface, wherein the projection screen includes a liquid crystal microdroplet (LCMD) display so that the projection screen change state between transparent and opaque under an electrical voltage, and an anti-glare coating adhered to at least one of the first and second surface. The apparatus further includes a transparent sheet between the projection screen and the anti-glare coating. The transparent sheet includes a transparent glass or a transparent plastic. The LCMD display is transparent when an electrical voltage is applied. The LCMD display is opaque when an electrical voltage is withdrawn or reduced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A window apparatus, the apparatus comprising:
    a first layer, wherein the first layer includes a liquid crystal microdroplet (LCMD) display switchable between transparent and opaque states in response to a change in an applied electrical and capable to display a projected image;
    a second layer coupled to the first layer, wherein the second layer is changeable between a light transmitting configuration and a light blocking configuration; and
    wherein operational states of the window apparatus including a projection state, an opaque state and a see-through state changeable by combining different states of the first layer and the second layer;
    wherein in the projection state, the first layer receives a projected image, the second layer is in a closed state or an open state;
    wherein in the opaque state, the first layer is in an opaque state which may have a function as a light diffuser to bring soft light into a room, or save energy by rejecting heat, such as infrared light;
    wherein in first see-through state, the first layer is in a transparent state and the second layer is in an open state, the window apparatus can function as a traditional closed window, allowing a viewer to see through from either side of the window and allowing light to pass through;
    wherein in second see-through state, both the first layer and second layer are in open state, the window apparatus can function as an opened traditional window, allowing both light and air to pass through.

2. The window apparatus of claim 1 wherein the LCMD display is adapted to display a projected image.

3. The window apparatus of claim 1 further comprising a frame to which the first and second layers are mounted.

4. The window apparatus of claim 1 wherein the first layer is bonded to the second layer.

5. The window apparatus of claim 1 wherein the first layer and second layer are fused together.

6. The window apparatus of claim 1 wherein the LCMD display is a non-homogenous polymer dispersed liquid crystal display (NPD-LCD).

7. The window apparatus of claim 1 wherein the LCMD display is a positive mode LCMD display.

8. The window apparatus of claim 1 wherein the LCMD display is a negative mode LCMD display.

9. The window apparatus of claim 1 wherein the first layer is movable between a closed configuration and an open configuration.

10. The window apparatus of claim 1 wherein the second layer is movable between a closed and an open configuration.

11. The window apparatus of claim 1 wherein the second layer is switchable between the light transmitting configuration and the light blocking configuration in response to a change in an applied electrical voltage.

12. The window apparatus of claim 1 wherein the second layer includes a switchable twisted nematic liquid crystal display (TN-LCD), a super twisted nematic liquid crystal display (STN-LCD), a dichroic liquid crystal display (dichroic LCD), a dichroic liquid crystal microdroplet (LCMD) display, a suspended particle device (SPD), or an electrochromic device (ECD) switchable from a light transmitting configuration to a light blocking configuration in response to a change in an applied electrical voltage.

13. The window apparatus of claim 1 wherein the second layer includes a light blocking panel made of wood, paper, plastic, leather, textiles, glass, metal, inorganic material, or a combination thereof.

14. The window apparatus of claim 1, further comprising a projector adapted to provide a projected image to the first layer.

15. The window apparatus of claim 1 wherein the second layer is movable to open and close through a driving system including an electric motor.

16. The window apparatus of claim 1 further comprising an anti-glare coating or anti-glare film applied to the first layer.

17. The window apparatus of claim 1 further comprising a short throw projector adapted to provide a projected image to the first layer.

18. The apparatus of claim 1 wherein the first layer is adapted for use as a dry erase board.

19. The apparatus of claim 1 wherein the first layer is adapted for use as a touch screen panel.

20. An anti-glare projection screen apparatus, the apparatus comprising:
a projection screen including a liquid crystal microdroplet (LCMD) display switchable between a transparent state and an opaque state in response to a change in an applied electrical voltage; and
a frame coupled to the microdroplet (LCMD) display and wherein the liquid crystal microdroplet (LCMD) display is movable between an open state and a closed state; and an anti-glare mechanism on the LCMD display;
wherein operational states of the window apparatus including a projection state or an opaque state and a see-through state changeable by combining different states of the first layer and the second layer;
wherein in the projection state, the first layer receives a projected image, the second layer is in a closed state or an open state;
wherein in the opaque state, the first layer is in an opaque state which may have a function as a light diffuser to bring soft light into a room, or save energy by rejecting heat, such as infrared light;
wherein in first see-through state, the first layer is in a transparent state and the second layer is in an open state, the window apparatus can function as a traditional closed window, allowing a viewer to see through from either side of the window and allowing light to pass through;
wherein in second see-through state, both the first layer and second layer are in open state, the window apparatus can function as an opened traditional window, allowing both light and air to pass through.

21. The apparatus of claim 20, further comprising a transparent layer between the projection screen and the anti-glare coating or anti-glare film.

22. The apparatus of claim 21 wherein the transparent layer includes a transparent glass or a transparent plastic.

23. The apparatus of claim 20 wherein the LCMD display is a positive mode LCMD display.

24. The apparatus of claim 20 wherein the LCMD display is a negative mode LCMD display.

25. The apparatus of claim 20, wherein the LCMD display includes a non-homogenous polymerdispersed liquid crystal display (NPD-LCD).

26. A method of installing a window apparatus, the method comprising:
installing a first layer of the window apparatus, wherein the first layer includes a projection screen or projection film;
installing a second layer of the window apparatus, wherein the second layer is coupled to the first layer and the second layer is changeable between a light transmitting configuration and a light blocking configuration; and
a frame coupled to both the first layer and the second layer; wherein at least one of the first layer or the second layer is movable between an open state and a closed state;
wherein operational states of the window apparatus including a projection state or an opaque state and a see-through state changeable by combining different states of the first layer and the second layer;
wherein in the projection state, the first layer receives a projected image, the second layer is in a closed state or an open state;
wherein in the opaque state, the first layer is in an opaque state which may have a function as a light diffuser to bring soft light into a room, or save energy by rejecting heat, such as infrared light;
wherein in first see-through state, the first layer is in a transparent state and the second layer is in an open state, the window apparatus can function as a traditional closed window, allowing a viewer to see through from either side of the window and allowing light to pass through;
wherein in second see-through state, both the first layer and second layer are in open state, the window apparatus can function as an opened traditional window, allowing both light and air to pass through.

27. The method of claim 26 further comprising installing a frame between the indoor region and the outdoor region, wherein the first and second layers are mounted to the frame.

28. The method of claim 26 further comprising connecting the window apparatus to a power supply.

29. The method of claim 26 wherein the LCMD display is a non-homogenous polymer dispersed liquid crystal display (NPD-LCD).

30. The method of claim 26 wherein the first layer is adapted to display images projected from a short throw projector.

31. The method of claim 26 wherein the second layer includes a light blocking panel having a closed configuration and an open configuration.

32. The method of claim 31 wherein the light blocking panel in the closed configuration is switchable between a transparent state and a darkened state.

33. The method of claim 31 wherein the light blocking panel is movable between the closed configuration and the open configuration in response to activation of an electrical power supply.

34. The method of claim 26 wherein the second layer includes a switchable liquid crystal display or a switchable suspended particle device or a switchable electrochromic device.

35. A window apparatus, the apparatus comprising:
a first layer, wherein the first layer includes a light diffusion device; and
a second layer coupled to the first layer, wherein the second layer is changeable between a light transmitting configuration and a light blocking configuration;
a frame coupled to both the first layer and the second layer; wherein at least one of the first layer or the second layer is movable between an open state and a closed state;
wherein operational states of the window apparatus including a projection state or an opaque state and a see-through state changeable by combining different states of the first layer and the second layer;
wherein in the projection state, the first layer receives a projected image, the second layer is in a closed state or an open state;
wherein in the opaque state, the first layer is in an opaque state which may have a function as a light diffuser to bring soft light into a room, or save energy by rejecting heat, such as infrared light;
wherein in the see-through state, both the first layer and second layer are in open state, the window apparatus can function as an opened traditional window, allowing both light and air to pass through.

36. The window apparatus of claim 35 wherein the first layer includes a fiberglass projection screen.

37. The window apparatus of claim 35 wherein the light diffusion device includes a projection screen or film.

38. The window apparatus of claim 35 wherein the first layer is adapted for use as a dry erase board.

39. The window apparatus of claim 35 wherein the first layer is adapted for use as a touch screen panel.

* * * * *